United States Patent
Kikuchi et al.

(10) Patent No.: US 8,252,486 B2
(45) Date of Patent: Aug. 28, 2012

(54) CO TOLERANT MULTICOMPONENT ELECTRODE CATALYST FOR SOLID POLYMER FUEL CELL

(75) Inventors: Ryuji Kikuchi, Kyoto (JP); Tatsuya Takeguchi, Hokkaido (JP)

(73) Assignees: Kyoto University, Kyoto (JP); National University Corporation Hokkaido University, Hokkaido (JP)

(*) Notice: Subject to any disclaimer, the term of this patent is extended or adjusted under 35 U.S.C. 154(b) by 896 days.

(21) Appl. No.: 11/988,683

(22) PCT Filed: Jul. 14, 2006

(86) PCT No.: PCT/JP2006/314437
§ 371 (c)(1),
(2), (4) Date: Dec. 29, 2008

(87) PCT Pub. No.: WO2007/011004
PCT Pub. Date: Jan. 25, 2007

(65) Prior Publication Data
US 2009/0181285 A1    Jul. 16, 2009

(30) Foreign Application Priority Data

Jul. 15, 2005  (JP) .................................. 2005-206384

(51) Int. Cl.
*H01M 4/02* (2006.01)
*H01M 4/94* (2006.01)

(52) U.S. Cl. ......... 429/528; 429/524; 429/525; 429/526
(58) Field of Classification Search ........... 429/523–528
See application file for complete search history.

(56) References Cited

U.S. PATENT DOCUMENTS

| | | | |
|---|---|---|---|
| 2003/0157393 A1* | 8/2003 | Choi et al. ........... | 429/40 |
| 2003/0198849 A1 | 10/2003 | Hampden-Smith | |
| 2004/0131919 A1* | 7/2004 | Yasumoto et al. .............. | 429/42 |
| 2006/0014068 A1* | 1/2006 | Boysen et al. .................. | 429/33 |
| 2006/0057355 A1* | 3/2006 | Suzuki et al. .............. | 428/308.4 |
| 2006/0178260 A1* | 8/2006 | Zhong et al. ................... | 502/185 |
| 2007/0065709 A1* | 3/2007 | Petrovic et al. ................. | 429/38 |

FOREIGN PATENT DOCUMENTS

| | | |
|---|---|---|
| EP | 1524713 | 4/2005 |
| JP | 10-270056 | 10/1998 |
| JP | 2001-219271 | 8/2001 |
| JP | 2004-146223 | 5/2004 |
| JP | 2004-197130 | 7/2004 |
| JP | 2005-50759 | 2/2005 |
| JP | 2006-140152 | 6/2006 |
| WO | WO 00/54346 | 9/2000 |

OTHER PUBLICATIONS

Takeguchi, T., et al.: "Tankasuiso Kaishitsu Gas no Chokusetsu Shiyo o Knao to suru PEFC-yo Anode no Kaihatsu", Dai 35 Kai Sekiyu Sekiyukagaku Toronkai Koen Yoshi, p. 93, 2005.
Anzai, Y., et al.: "PEFC no Anode-yo Co Taisei $SnO_2$ Tanji Pt oyobi Pd Shokubai no Kenkyu", Dai 94 Kai Shokubai Toronkai Toronkai A Yokoshu, p. 407, 2004.

* cited by examiner

*Primary Examiner* — Patrick Ryan
*Assistant Examiner* — Muhammad Siddiquee
(74) *Attorney, Agent, or Firm* — Morgan, Lewis & Rockius LLP

(57) ABSTRACT

Disclosed is an electrode catalyst for solid polymer fuel cells wherein CO tolerance is improved. Specifically disclosed is a catalyst for fuel cells having a first catalyst and a second catalyst. The first catalyst contains Pd, C and an oxide, namely $SnO_2$ or $TiO_2$, and the second catalyst contains C and an alloy containing Pt and Ru.

16 Claims, 2 Drawing Sheets

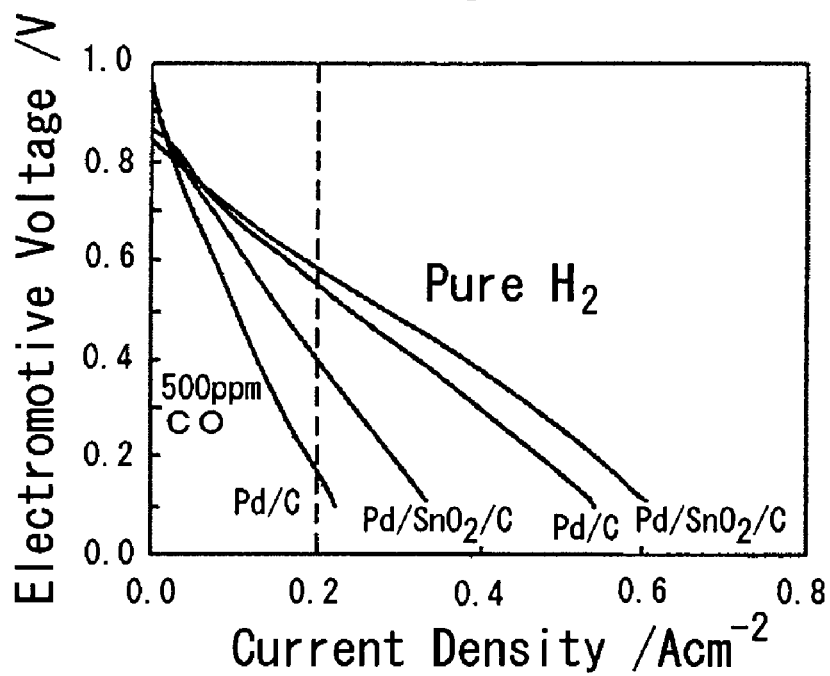

US 8,252,486 B2

CO TOLERANT MULTICOMPONENT ELECTRODE CATALYST FOR SOLID POLYMER FUEL CELL

CROSS-REFERENCE TO RELATED APPLICATIONS

The present application is a U.S. National Phase Application of International Application PCT/JP2006/0314437, filed Jul. 14, 2006, which claims the benefit of Japanese Patent Application No. 2005-206384, filed Jul. 15, 2005, each of which is incorporated by reference in its entirety.

FIELD OF THE INVENTION

The present invention relates to an electrode catalyst for a solid polymer fuel cell, and specifically a multicomponent electrode catalyst for a solid polymer fuel cell having resistance to CO poisoning.

BACKGROUND OF THE INVENTION

Solid polymer fuel cells are expected as new energy sources since they utilize chemical reaction between oxygen and hydrogen and therefore are environmentally-friendly. Technical development of such fuel cells has been promoted.

As a hydrogen supply source for a fixed-type solid polymer fuel cell, hydrogen gas, which is obtained by means of reforming of hydrocarbon (reformed gas), may be used. However, it is known that such reformed gas contains a trace amount of carbon monoxide (CO) as a side reaction product. This CO strongly adsorbs to the surface of a platinum catalyst, which is used as an electrode, resulting in poisoning. The problem had been that platinum's catalyst activity for hydrogen oxidation is inhibited thereby (M. Watanabe, S. Motoo, J. Electroanal. Chem., 60, 267 (1975)).

In order to prevent such CO poisoning, Pt—Ru binary-type alloy has been conventionally used as an electrode catalyst having resistance to CO poisoning. However, in general, the upper limit of CO concentration is about 200 ppm, and therefore, resistance to CO poisoning of the binary-type alloy is still insufficient. For this reason, when using an electrode catalyst utilizing Pt—Ru binary-type alloy, a unit for shift reaction and selective oxidation reaction, which reduces CO concentration in reformed gas, is required. This has been a major reason for high production costs of fixed-type fuel cells.

SUMMARY OF THE INVENTION

The purpose of the present invention is to provide an electrode catalyst for a solid polymer fuel cell with improved resistance to CO poisoning.

The present inventors diligently researched in order to solve the above-described problem, and found that resistance to CO poisoning is spectacularly improved by using a multicomponent catalyst comprising a predetermined oxide and Pd together with Pt—Ru binary-type alloy, as an electrode catalyst for a solid polymer fuel cell, and that thereby an electrode catalyst which shows almost no deterioration in spite of coexistence of thousands ppm level of CO can be obtained. Thus, the present invention was completed.

Further, it was found that resistance to CO poisoning is spectacularly improved by setting the content ratio of Pt to Ru contained in Pt—Ru binary-type alloy within a predetermined range, and that thereby an electrode catalyst which shows almost no deterioration in spite of coexistence of thousands ppm level of CO can be obtained. Thus, the present invention was completed.

That is, the present invention provides a catalyst for fuel cells having a first catalyst and a second catalyst, wherein the first catalyst comprises: an oxide that is $SnO_2$ or $TiO_2$; Pd; and C, and wherein the second catalyst comprises: an alloy including Pt and Ru; and C, characterized in that the content of Ru is in the range from 25 to 75 wt % with respect to Pt.

In the present invention, it is preferable that the oxide consists of ultrafine particles, and it is more preferable that the average particle size of said $SnO_2$ is in the range from 2 to 5 nm and that the average particle size of said $TiO_2$ is in the range from 3 to 15 nm.

Further, in the present invention, it is preferable that in the first catalyst, ultrafine particles of $SnO_2$ or $TiO_2$ and Pd are carried on a carbon carrier, and that in the second catalyst, ultrafine particles of the alloy including Pt and Ru are carried on a carbon carrier.

Moreover, in the present invention, it is preferable that the weight ratio of the first catalyst to the second catalyst is in the range from 1:0.5 to 1:2.

Furthermore, in the present invention, it is preferable that in the first catalyst, the weight ratio of the oxide to C is in the range from 1:3 to 1:8, and that the weight ratio of Pd to C is in the range from 1:3 to 1:8. It is preferable that in the second catalyst, the weight ratio of the alloy including Pt and Ru to C is in the range from 1:0.5 to 1:2.

Moreover, the present invention provides a fuel cell, which is characterized in that at least one of a cathode electrode and an anode electrode comprises the catalyst for fuel cells of the present invention.

According to the present invention, a catalyst for fuel cells with spectacularly improved resistance to CO poisoning can be obtained. The catalyst shows almost no deterioration in spite of coexistence of thousands ppm level of CO, and therefore can contribute to cost reduction of fixed-type fuel cells.

BRIEF DESCRIPTION OF THE DRAWINGS

FIG. 3 is a graph showing results of current-voltage measurement of a solid polymer fuel cell using a Pd/C catalyst or a Pd/$SnO_2$/C catalyst.

BEST MODE FOR CARRYING OUT THE INVENTION

Figure 1:
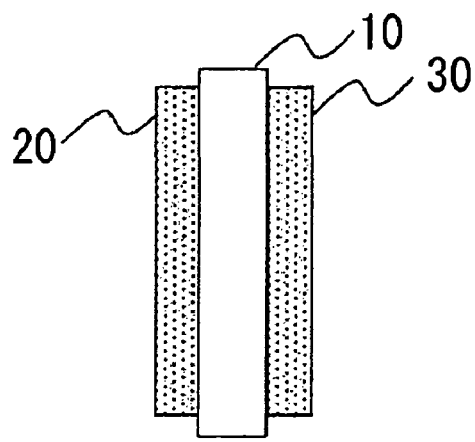
FIG. 1 is a cross-sectional schematic view showing one embodiment of the fuel cell of the present invention.

The present invention provides a catalyst for fuel cells having a first catalyst and a second catalyst, wherein the first catalyst comprises: an oxide that is $SnO_2$ or $TiO_2$; Pd; and C, and wherein the second catalyst comprises: an alloy including Pt and Ru; and C, characterized in that the content of Ru is in the range from 25 to 75 wt % with respect to Pt.

In the present invention, the first catalyst comprises: an oxide that is $SnO_2$ or $TiO_2$; Pd; and C.

In the present invention, examples of Cs to be contained in the first catalyst include, but are not particularly limited to, carbon carriers which are generally used in catalysts for fuel cells. For example, Vulcan XC-72R (manufactured by Cabot Corporation) and the like can be used.

In the present invention, it is preferable that the oxide contained in the first catalyst consists of ultrafine particles from the viewpoint of effective influence on CO adsorption performance of noble metals and the size for having characteristics of oxide as a carrier.

Specifically, the average particle size of $SnO_2$ is preferably in the range from 2 to 5 nm, and more preferably in the range from 2.5 to 3.5 nm.

The average particle size of $TiO_2$ is preferably in the range from 3 to 15 nm, more preferably in the range from 3 to 8 nm, and still more preferably in the range from 3 to 5 nm.

In the present invention, from the viewpoint of effective influence on Pd, the content of the oxide to be contained in the first catalyst is preferably in the range from 12.8 to 33.3 wt % with respect to C, more preferably in the range from 20 to 30 wt %, and still more preferably in the range from 23 to 27 wt %.

In the present invention, from the viewpoint of increase in the amount of Pd atoms present on the surface of the first catalyst, the content of Pd to be contained in the first catalyst is preferably in the range from 12.8 to 33.3 wt % with respect to C, more preferably in the range from 20 to 30 wt %, and still more preferably in the range from 23 to 27 wt %.

In the present invention, the second catalyst comprises: an alloy including Pt and Ru; and C.

In the present invention, the content of Ru in the alloy including Pt and Ru is preferably in the range from 25 to 75 wt % with respect to Pt, more preferably in the range from 35 to 65 wt %, and still more preferably in the range from 40 to 60 wt %.

As in the case of C to be contained in the first catalyst, examples of Cs to be contained in the second catalyst include, but are not particularly limited to, carbon carriers which are generally used in catalysts for fuel cells. For example, Vulcan XC-72R (manufactured by Cabot Corporation) and the like can be used.

In the present invention, examples of alloys including Pt and Ru to be contained in the second catalyst include, but are not particularly limited to, alloys which are generally used in catalysts for fuel cells.

In the present invention, from the viewpoint of a large surface area of Pt—Ru alloy and exertion of electrochemical performance, the content of the alloy to be contained in the second catalyst is preferably in the range from 20 to 200 wt % with respect to C, more preferably in the range from 20 to 100 wt %, still more preferably in the range from 60 to 85 wt %, and particularly preferably in the range from 75 to 85 wt %.

In the present invention, a commercially-available Pt—Ru/C catalyst can be used as the second catalyst. Examples of such catalysts may include "IFPC30A" manufactured by Ishifuku Metal Industry Co., Ltd.

In the present invention, it is preferable that in the first catalyst, ultrafine particles of $SnO_2$ or $TiO_2$ and Pd are carried on a carbon carrier, and that in the second catalyst, ultrafine particles of the alloy including Pt and Ru are carried on a carbon carrier. The definitions regarding the ultrafine particles and carbon carriers in this case are as described above.

In the present invention, from the viewpoint of high resistance to CO and exertion of sufficient electrochemical characteristics, the weight ratio of the first catalyst to the second catalyst is preferably in the range from 1:0.5 to 1:2, more preferably in the range from 1:0.5 to 1:1.5, and still more preferably in the range from 1:0.8 to 1:1.2.

In the catalyst for fuel cells of the present invention, the carrying amount of noble metals (Pt+Pd) is preferably in the range from 0.2 $mg/cm^2$ to 2 $mg/cm^2$, more preferably in the range from 0.2 $mg/cm^2$ to 1.5 $mg/cm^2$, and still more preferably in the range from 0.3 $mg/cm^2$ to 1 $mg/cm^2$.

The catalyst for fuel cells of the present invention can be prepared using, for example, the following method.

Firstly, $SnO_2$ ultrafine particles are prepared by means of a publicly-known sol-gel method. $TiO_2$ ultrafine particles are prepared by means of a publicly-known glycothermal method.

The oxide thus prepared is mixed with a dinitrodiamine Pd nitrate solution, and the mixture is impregnated into and carried on a carbon carrier, "Vulcan XC-72R" (manufactured by Cabot Corporation).

Next, the carbon carrier Vulcan XC-72R, which is impregnated with and carries the mixture, is heated in a nitrogen stream to 250 to 350° C. at a rate of temperature increase of 100° C. per hour or slower, and is retained for 20 to 60 minutes to obtain a first catalyst.

By mixing the first catalyst thus obtained with a second catalyst such as Pt—Ru/C (IFPC30A, manufactured by Ishifuku Metal Industry Co., Ltd), the catalyst for fuel cells of the present invention can be obtained.

The present invention provides a fuel cell characterized in that at least one of a cathode electrode and an anode electrode comprises the catalyst for fuel cells of the present invention.

Hereinafter, explanation will be made with reference to FIG. 1, which is a cross-sectional schematic view showing one embodiment of the fuel cell of the present invention (membrane-electrode assembly: MEA).

As shown in FIG. 1, the membrane-electrode assembly comprises an electrolyte membrane 10, an anode electrode 20 and a cathode electrode 30.

Examples of the electrolyte membranes 10 include, but are not particularly limited to, solid-type polymer electrolyte membranes such as fluorine-based resins having a sulfonic acid group. Specifically, a fluorine-based resin (e.g., Nafion (registered trademark) 117 (manufactured by Aldrich Chemical Company, perfluorinated membrane, thickness: 0.007 inch)) and the like can be used.

At least one of the anode electrode 20 and the cathode electrode 30 shown in FIG. 1 comprises the catalyst for fuel cells of the present invention. In this case, the electrode can be obtained, for example, by getting the catalyst for fuel cells of the present invention to be carried by means of a usual paste method.

Specifically, the catalyst for fuel cells of the present invention is mixed with a solution of a fluorine-based resin (e.g., Nafion (registered trademark) 11 (manufactured by Aldrich Chemical Company)), water and an organic solvent, and the mixture is sufficiently stirred to prepare a paste.

The solid content of the paste is preferably in the range from 3 to 10 wt %, more preferably in the range from 5 to 7 wt %, and still more preferably in the range from 6 to 7 wt %.

Examples of the organic solvents to be used for preparation of paste include n-butyl acetate.

The obtained paste is applied to a carbon paper (GDL P50T Paper, manufactured by Ballard Material Products, Inc.) to obtain an electrode.

In this regard, from the viewpoint of effective utilization of noble metals, the carrying amount of noble metals (Pt+Pd) in the electrode is preferably in the range from 0.2 $mg/cm^2$ to 2 $mg/cm^2$, more preferably in the range from 0.2 $mg/cm^2$ to 1.5 $mg/cm^2$, and still more preferably in the range from 0.3 $mg/cm^2$ to 1 $mg/cm^2$.

Both a cathode electrode and an anode electrode can comprise the catalyst for fuel cells of the present invention. From the viewpoint of effective utilization of noble metals Ru and Pd, it is preferable that only the anode electrode comprises the catalyst for fuel cells of the present invention.

In this case, as the cathode electrode, for example, a Pt electrode which is prepared by means of a transfer method (the carrying amount of noble metals: from 0.3 mg/cm² to 2 mg/cm²) is used.

The cathode electrode, the anode electrode and the electrolyte membrane obtained in this way, are disposed in the order shown in FIG. 1, and are hot-pressed to obtain a membrane-electrode assembly.

EXAMPLES

Hereinafter, the present invention will be described based on examples. The present invention is not limited only to the following Examples.

Example 1

(1) Preparation of Anode Catalyst (Containing $SnO_2$)

All catalysts were prepared by means of an impregnation method. Firstly, $SnO_2$ ultrafine particles (the average particle size: 4 nm) were prepared by means of a sol-gel method. The $SnO_2$ ultrafine particles were mixed with a dinitrodiamine Pd nitrate solution (manufactured by Tanaka Kikinzoku).

Pt—Ru/C (manufactured by Ishifuku Metal Industry Co., Ltd., IFPC30A, the weight ratio of Pt—Ru to C is about 1:1, and the weight ratio of Pt to Ru is 30:15) was further mixed therewith. The mixed solution was impregnated into and carried on Vulcan XC-72R (manufactured by Cabot Corporation), and this was stirred and dried over 80° C. steam. The obtained powder was heated in a nitrogen stream to 300° C. at a rate of temperature increase of 200° C. per hour, and was retained at 300° C. for 30 minutes.

In the obtained catalyst, the weight ratio of $SnO_2$:Pd:C in a portion corresponding to a first catalyst was about 1:1:6, and the weight ratio of the first catalyst to a second catalyst was about 1:1.

Further, in order to examine the content ratio of Pt to Ru in Pt—Ru alloy in this $SnO_2$-containing catalyst, the following two comparative catalysts were prepared. Specifically, a comparative catalyst 2 was prepared in the same manner, except that the weight ratio of Pt to Ru in Pt—Ru/C was 20:20, and a comparative catalyst 3 was prepared in the same manner, except that the weight ratio of Pt to Ru in Pt—Ru/C was 1:0 (i.e., Pt/C).

(2) Preparation of Anode Catalyst (Containing $TiO_2$)

$TiO_2$ ultrafine particles were prepared by means of a glycothermal method (the average particle size: 6 to 10 nm). The anode catalyst was prepared in a manner similar to that in item (1), except that the weight ratio of $TiO_2$:Pd:C was about 1:1:6 and the weight ratio of Pd/$TiO_2$/C to Pt—Ru/C (manufactured by Ishifuku Metal Industry Co., Ltd., IFPC30A) was about 1:1.

(3) Preparation of Catalyst Paste for Application

In order to get the catalyst to act as an electrode, catalyst paste for application to be mounted on an electrode substrate was prepared. Specifically, n-butyl acetate (manufactured by Wako Pure Chemical Industries, Ltd.), 5 wt % Nafion (registered trademark) solution (manufactured by Aldrich Chemical Company), ion-exchange water, catalyst prepared in item (1) or (2) above, and Vulcan XC-72R (manufactured by Cabot Corporation) were mixed together at a ratio of 5:10:1:1:0.4 (weight ratio).

(4) Experiment of Electrical Power Generation of Cell Using Solid Polymer Fuel Cells (Polymer Electrolyte Fuel Cell (PEFC))

A membrane-electrode assembly (MEA) was prepared using the catalyst paste. Firstly, the catalyst paste prepared in item (3) above was applied onto a carbon paper (P50T, 5 cm², manufactured by Ballard Material Products, Inc.) so that the amount of noble metals (Pd+Pt) was 1 mg/cm², and this was left overnight to be sufficiently dried. A spatula was used for applying the paste. Application was carefully carried out, that is, a little amount of paste was applied and dried, and this process was repeated over and over, so that irregularity of the surface of catalyst was reduced. As a catalyst of the cathode side, 40 wt % Pt/C, which was prepared separately, was used.

The catalysts for anode and cathode were applied to different carbon papers. After that, Nafion (registered trademark) 117 (manufactured by Aldrich Chemical Company), which acts as an electrolyte membrane, was sandwiched between the prepared electrodes, and this was hot-pressed under 2 Mpa at 130° C. for 10 minutes to produce MEA. Before using Nafion (registered trademark) 117 membrane, it was cut to a suitable size to be used (having the same area as that of dies for use in hot-pressing), and after that, the Nafion piece was boiled in 5M $H_2SO_4$ and was further immersed therein for a day. The prepared MEA was incorporated into a housing manufactured by Electrochem (electrode area: 5 cm²), and this was connected to an apparatus for evaluation of electrical power generation performance (manufactured by CHINO Corporation) to carry out current-voltage measurement.

$H_2$ (or 5000 ppm or more of CO/$H_2$) was supplied to the anode at a flow rate of 50 ml/min. $O_2$ (or air) was supplied to the cathode at a flow rate of 50 ml/min. These gases were humidified via a bubbler at 70° C. before supplied to a cell (both in the cases of the anode and cathode). The cell temperature at the time of measurement was 70° C.

A comparative fuel cell was prepared in a manner similar to that described above, except that Pt—Ru/C (manufactured by Ishifuku Metal Industry Co., Ltd.; IFPC30A; the weight ratio of Pt to Ru is 30:15; comparative catalyst 1) was used as an anode catalyst.

Figure 2:
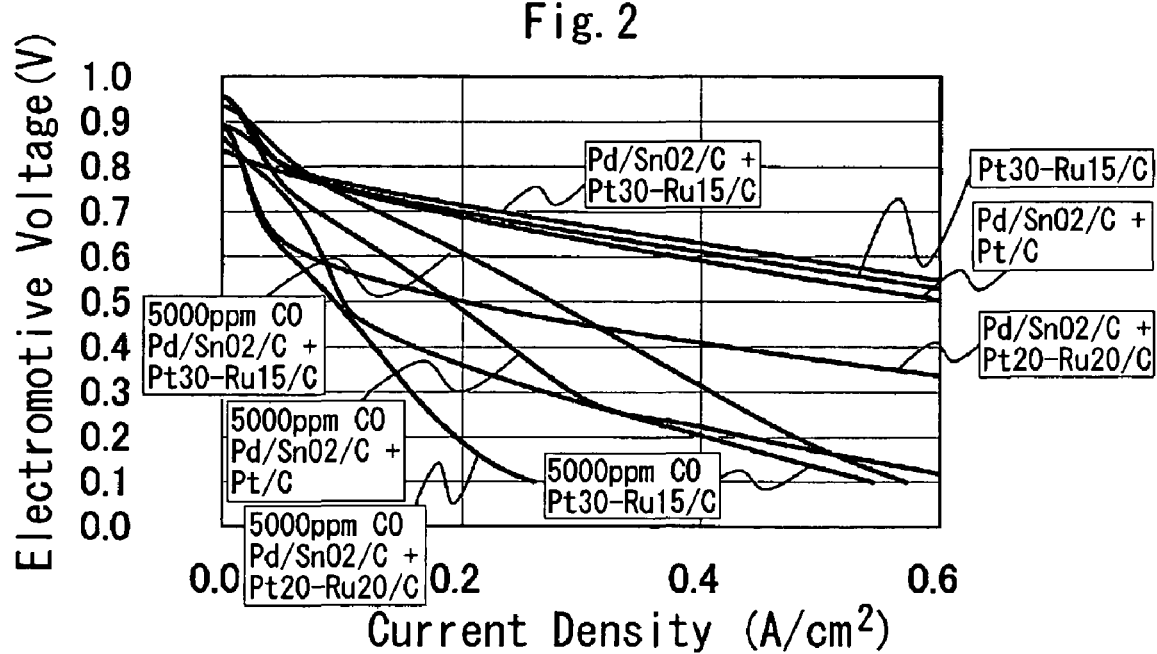
FIG. 2 is a graph showing results of current-voltage measurement of a solid polymer fuel cell using a Pt—Ru/C catalyst or a Pd/$SnO_2$/C+Pt—Ru/C catalyst.

The results of current-voltage measurement are shown in FIG. 2 (comparison with $SnO_2$-containing anode catalyst).

As shown in FIG. 2, electrical power was generated under conditions where 5000 ppm or more of CO was supplied, and electromotive voltages were compared with one another at a current density of 0.2 A/cm². The electromotive voltage in the case of Pt—Ru (comparative catalyst 1), which has been considered to be most resistant, was 0.36 V (see "5000 ppm CO Pt30-Ru15/C" in FIG. 2). Compared with this, the electromotive voltage in the case where the catalyst of the present invention ($SnO_2$-containing anode catalyst) was used was 0.61 V (see "5000 ppm CO Pd/SnO2/C+Pt30-Ru15/C" in FIG. 2).

The electromotive voltage in the case of the comparative catalyst 2, which was for examining the content ratio of Pt to Ru in the Pt—Ru alloy in this $SnO_2$-containing catalyst, was 0.19 V (see "5000 ppm CO Pd/SnO2/C+Pt20-Ru20/C" in FIG. 2). The electromotive voltage in the case of the comparative catalyst 3 was 0.48 V (see "5000 ppm CO Pd/SnO2/C+Pt/C" in FIG. 2).

The same measurement was carried out using a fuel cell in which a $TiO_2$-containing anode catalyst was used as an anode catalyst. In this case, the electromotive voltage at a current density of 0.2 A/cm² was 0.60 V.

According to these results, it is understood that the fuel cell of the present invention showed much higher resistance to CO poisoning compared to the conventional catalyst (comparative catalyst 1).

It is considered that electrical power generation was accelerated because CO was removed by the second catalyst, Pt—Ru/C, and because CO is poorly adsorbed by the first catalyst, Pd/SnO$_2$/C or Pd/TiO$_2$/C, compared to Pt. However, this mechanism is just a hypothesis. The present invention is not limited to the mechanism.

Moreover, it is also understood that the fuel cell of the present invention showed much higher resistance to CO poisoning compared to the comparative catalysts 2 and 3.

Example 2

Next, in order to examine resistance to CO poisoning in the case of using Pd/SnO$_2$/C solely as a catalyst, the following measurement was carried out.

Firstly, SnO$_2$ ultrafine particles (the average particle size: 4 nm) were prepared by means of a sol-gel method. The SnO$_2$ ultrafine particles were mixed with a dinitrodiamine Pd nitrate solution (manufactured by Tanaka Kikinzoku). The mixed solution was impregnated into and carried on Vulcan XC-72R (manufactured by Cabot Corporation), and this was stirred and dried over 80° C. steam. The obtained powder was heated in a nitrogen stream to 300° C. at a rate of temperature increase of 200° C. per hour, and was retained at 300° C. for 30 minutes. In the obtained catalyst, the weight ratio of SnO$_2$: Pd:C was about 1:1:6.

A membrane-electrode assembly (MEA) was prepared in a manner similar to that in Example 1, except that the catalyst thus obtained was used as an anode catalyst. The prepared MEA was incorporated into a housing manufactured by Electrochem (electrode area: 5 cm$^2$), and this was connected to an apparatus for evaluation of electrical power generation performance (manufactured by CHINO Corporation) to carry out current-voltage measurement.

H$_2$ (or 500 ppm or more of CO/H$_2$) was supplied to the anode at a flow rate of 50 ml/min. O$_2$ (or air) was supplied to the cathode at a flow rate of 50 ml/min. These gases were humidified via a bubbler at 70° C. before supplied to a cell (both in the cases of the anode and cathode). The cell temperature at the time of measurement was 70° C.

Further, a dinitrodiamine Pd nitrate solution (manufactured by Tanaka Kikinzoku) was impregnated into and carried on Vulcan XC-72R (manufactured by Cabot Corporation), and this was stirred and dried over 80° C. steam. The obtained powder was heated in a nitrogen stream to 300° C. at a rate of temperature increase of 200° C. per hour, and was retained at 300° C. for 30 minutes. In the obtained Pd/C catalyst, the weight ratio of Pd to C was about 1:6. Preparation was carried out in a manner similar to that described above, except that Pd/C of the anode catalyst of the fuel cell used for comparison was used.

The results of current-voltage measurement are shown in FIG. 3.

As shown in FIG. 3, electrical power was generated under conditions where 500 ppm of CO was supplied, and electromotive voltages were compared with one another at a current density of 0.2 A/cm$^2$. The electromotive voltage in the case of Pd/SnO$_2$/C was 0.41 V, which was higher than the electromotive voltage of Pd/C (0.18 V). However, the result was obtained when electrical power was generated under conditions where the CO concentration was a tenth of that in Example 1. Therefore, it still cannot be said that resistance to CO poisoning is sufficient. In fact, when electrical power was generated under conditions where 5000 ppm of CO was supplied, there was almost no catalyst activity, and the electromotive voltage was at an unmeasurable level.

INDUSTRIAL APPLICABILITY

According to the present invention, a catalyst for fuel cells with spectacularly improved resistance to CO poisoning can be obtained. The catalyst shows almost no deterioration in spite of coexistence of thousands ppm level of CO, and therefore can contribute to cost reduction of fixed-type fuel cells.

What is claimed is:

1. A multicomponent catalyst for fuel cells having a first catalyst and a second catalyst, wherein the first catalyst comprises: an oxide that is SnO$_2$ or TiO$_2$; Pd; and C, and wherein the second catalyst comprises: an alloy including Pt and Ru; and C, characterized in that the content of Ru is in the range from 25 to 75 wt % with respect to Pt, and wherein the weight ratio of the first catalyst to the second catalyst is in the range from 1:0.5 to 1:2.

2. A catalyst for fuel cells according to claim 1, wherein the oxide consists of ultrafine particles.

3. A catalyst for fuel cells according to claim 1, characterized in that in the first catalyst, ultrafine particles of SnO$_2$ or TiO$_2$ and Pd are carried on a carbon carrier, and in the second catalyst, ultrafine particles of the alloy including Pt and Ru are carried on a carbon carrier.

4. A catalyst for fuel cells according to claim 1, wherein the average particle size of said SnO$_2$ is in the range from 2 to 5 nm, and the average particle size of said TiO$_2$ is in the range from 3 to 15 nm.

5. A catalyst for fuel cells according to claim 1, wherein in the first catalyst, the weight ratio of the oxide to C is in the range from 1:3 to 1:8, and the weight ratio of Pd to C is in the range from 1:3 to 1:8.

6. A catalyst for fuel cells according to claim 1, wherein in the second catalyst, the weight ratio of the alloy including Pt and Ru to C is in the range from 1:0.5 to 1:2.

7. A fuel cell, wherein at least one of a cathode electrode and an anode electrode comprises the catalyst for fuel cells according to claim 1.

8. A catalyst for fuel cells according to claim 3, wherein the average particle size of said SnO2 is in the range from 2 to 5 nm, and the average particle size of said TiO2 is in the range from 3 to 15 nm.

9. A catalyst for fuel cells according to claim 3, wherein the weight ratio of the first catalyst to the second catalyst is in the range from 1:0.5 to 1:2.

10. A catalyst for fuel cells according to claim 3, wherein in the first catalyst, the weight ratio of the oxide to C is in the range from 1:3 to 1:8, and the weight ratio of Pd to C is in the range from 1:3 to 1:8.

11. A catalyst for fuel cells according to claim 3, wherein in the second catalyst, the weight ratio of the alloy including Pt and Ru to C is in the range from 1:0.5 to 1:2.

12. A fuel cell, wherein at least one of a cathode electrode and an anode electrode comprises the catalyst for fuel cells according to claim 3.

13. A catalyst for fuel cells according to claim 4, wherein the weight ratio of the first catalyst to the second catalyst is in the range from 1:0.5 to 1:2.

14. A catalyst for fuel cells according to claim 4, wherein in the first catalyst, the weight ratio of the oxide to C is in the range from 1:3 to 1:8, and the weight ratio of Pd to C is in the range from 1:3 to 1:8.

15. A catalyst for fuel cells according to claim 4, wherein in the second catalyst, the weight ratio of the alloy including Pt and Ru to C is in the range from 1:0.5 to 1:2.

16. A fuel cell, wherein at least one of a cathode electrode and an anode electrode comprises the catalyst for fuel cells according to claim 4.

* * * * *